(12) United States Patent
Satran et al.

(10) Patent No.: US 8,157,487 B2
(45) Date of Patent: Apr. 17, 2012

(54) CUTTING TOOL HAVING BIDIRECTIONAL ADJUSTMENT MECHANISM

(75) Inventors: Amir Satran, Kfar Vradim (IL); Alexander Bronshteyn, Nahariya (IL); Alexander Koifman, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 413 days.

(21) Appl. No.: 12/477,647

(22) Filed: Jun. 3, 2009

(65) Prior Publication Data

US 2010/0028091 A1 Feb. 4, 2010

(30) Foreign Application Priority Data

Aug. 4, 2008 (IL) .......................................... 193233

(51) Int. Cl.
*B23C 5/00* (2006.01)
*B23C 5/24* (2006.01)

(52) U.S. Cl. ........................... 407/39; 407/101; 407/103

(58) Field of Classification Search .................... 407/36, 407/39, 41, 46, 48, 73, 76, 87, 101, 103, 407/107, 108

See application file for complete search history.

(56) References Cited

U.S. PATENT DOCUMENTS

| | | | | |
|---|---|---|---|---|
| 1,368,459 A * | 2/1921 | Edwin | ............................ | 408/185 |
| 2,402,650 A * | 6/1946 | Maffia | ............................. | 407/68 |
| 4,078,868 A * | 3/1978 | Erkfritz | ............................ | 407/48 |
| 4,125,342 A * | 11/1978 | Kress | ............................ | 408/179 |
| 5,102,268 A * | 4/1992 | Mitchell | .......................... | 407/36 |
| 5,156,501 A * | 10/1992 | Pawlik et al. | .................... | 407/36 |
| 5,536,119 A * | 7/1996 | Werner et al. | .................... | 407/36 |
| 5,800,079 A * | 9/1998 | Qvarth | ............................. | 407/46 |
| 5,957,628 A * | 9/1999 | Bentjens et al. | ................. | 407/35 |
| 6,086,290 A * | 7/2000 | Qvarth et al. | .................... | 407/38 |
| 6,254,319 B1* | 7/2001 | Maier et al. | ....................... | 408/57 |
| 7,037,050 B1* | 5/2006 | Maier et al. | ....................... | 407/35 |
| 2006/0140730 A1 | 6/2006 | Schlagenhauf et al. | | |

FOREIGN PATENT DOCUMENTS

| | | |
|---|---|---|
| CH | 518 767 | 2/1972 |
| DE | 30 07 322 | 9/1981 |

OTHER PUBLICATIONS

Office Action in counterpart Israeli application No. 193233, dated Sep. 21, 2011.
Amendment in Response to Office Action filed Jan. 2, 2012.
International Search Report in PCT/IL2009/000595, dated Oct. 22, 2009.

* cited by examiner

*Primary Examiner* — Will Fridie, Jr.
(74) *Attorney, Agent, or Firm* — Womble Carlyle

(57) ABSTRACT

A cutting tool has cartridges in which cutting inserts may be retained. The location of each cartridge is adjustable by a bidirectional adjustment mechanism having an adjustment screw directed in the direction of adjustment. The adjustment screw has a head and a flexible flange with an annular recess therebetween. A protuberance projecting from the cartridge engages the annular recess with an interference fit thereby coupling the adjustment screw to the cartridge. As the adjustment screw is screw rotated about its axis of screw rotation it moves along the axis of screw rotation taking the cartridge with it. Screw rotation of the adjustment screw in opposite senses results in the adjustment of the position of the cartridge in opposite directions. Due to the fact that the protuberance is firmly located in the annular recess of the adjustment screw, play or backlash is eliminated.

24 Claims, 4 Drawing Sheets

CUTTING TOOL HAVING BIDIRECTIONAL ADJUSTMENT MECHANISM

FIELD OF THE INVENTION

The present invention relates to a cutting tool of the type in which a cutting insert may be retained in a cartridge and the location of the cutting insert is adjusted by bidirectional adjustment of the location of the cartridge.

BACKGROUND OF THE INVENTION

In metal cutting operations which require a smooth surface finish and in which milling cutters having multiple cutting inserts are used, the cutting inserts have to be positioned with the greatest possible accuracy, particularly in the axial direction. Non-accurate axial positioning of the cutting inserts results in axial runout which gives rise to poor surface finish and reduction in lifetime of the cutting inserts.

In milling cutters in which each cutting insert is secured to a replaceable cartridge clamped to the cutter body, the axial position of the cutting inserts can be adjusted by adjusting the position of the cartridges in the axial direction until all the operative cutting edges of the cutting inserts lie in a common plane. The simplest way of adjusting the position of such a cartridge is by unclamping the cartridge from the cutter body, manually re-positioning the cartridge to the desired position and then reclamping the cartridge to the cutter body. This process is both time consuming and not always accurate due to movement of the cartridge during re-clamping.

U.S. Pat. No. 5,102,268 discloses a milling cutter having a plurality of cutting insert retaining cartridges circumferentially spaced about the outer periphery of the cutter body. An adjustment mechanism for each cartridge includes an adjustment screw threaded into a corresponding inclined throughbore in the cutter body. The axis of the adjustment screw and the throughbore is coincident with a radius extending from the center of the cutter body. The head of the adjustment screw projects into the inclined throughbore so that when the adjustment screw is turned, the head of the screw bears against the inner surface of the throughbore causing the cartridge to be axially displaced. A locking screw is tightened to secure the cartridge in place after it has been adjusted. In order to accommodate the head of the adjustment screw in the throughbore, the throughbore has to be dimensioned larger than the head of the screw creating backlash.

U.S. Pat. No. 5,957,628 discloses a milling cutter having a plurality of cutting insert retaining cartridges circumferentially spaced about the outer periphery of the cutter body. An adjustment mechanism for each cartridge includes an adjustment screw threaded into a corresponding bore in the cutter body. The axis of the adjustment screw is approximately parallel to the axis of the cutter body. The head of the screw engages into a groove in the cartridge to provide axial adjustment of the cartridge. In order for the head of the screw to engage the groove, the groove has to be dimensioned larger than the head of the screw giving rise to play or backlash.

SUMMARY OF THE INVENTION

It is an object of the present invention to provide a cutting tool having a cutter body with a plurality of cutting insert retaining cartridges circumferentially spaced about the outer periphery of the cutter body, each cartridge being adjustable by an adjustment mechanism having an adjustment screw directed in the direction of adjustment of the cartridge. The adjustment screw has a narrow neck portion defining a recess between a flange and the adjustment screw head. A protuberance projecting from the cartridge engages the annular recess with an interference fit thereby eliminating play or backlash.

BRIEF DESCRIPTION OF THE DRAWINGS

For a better understanding of the present invention and to show how the same may be carried out in practice, reference will now be made to the accompanying drawings, in which.

Figure 1:
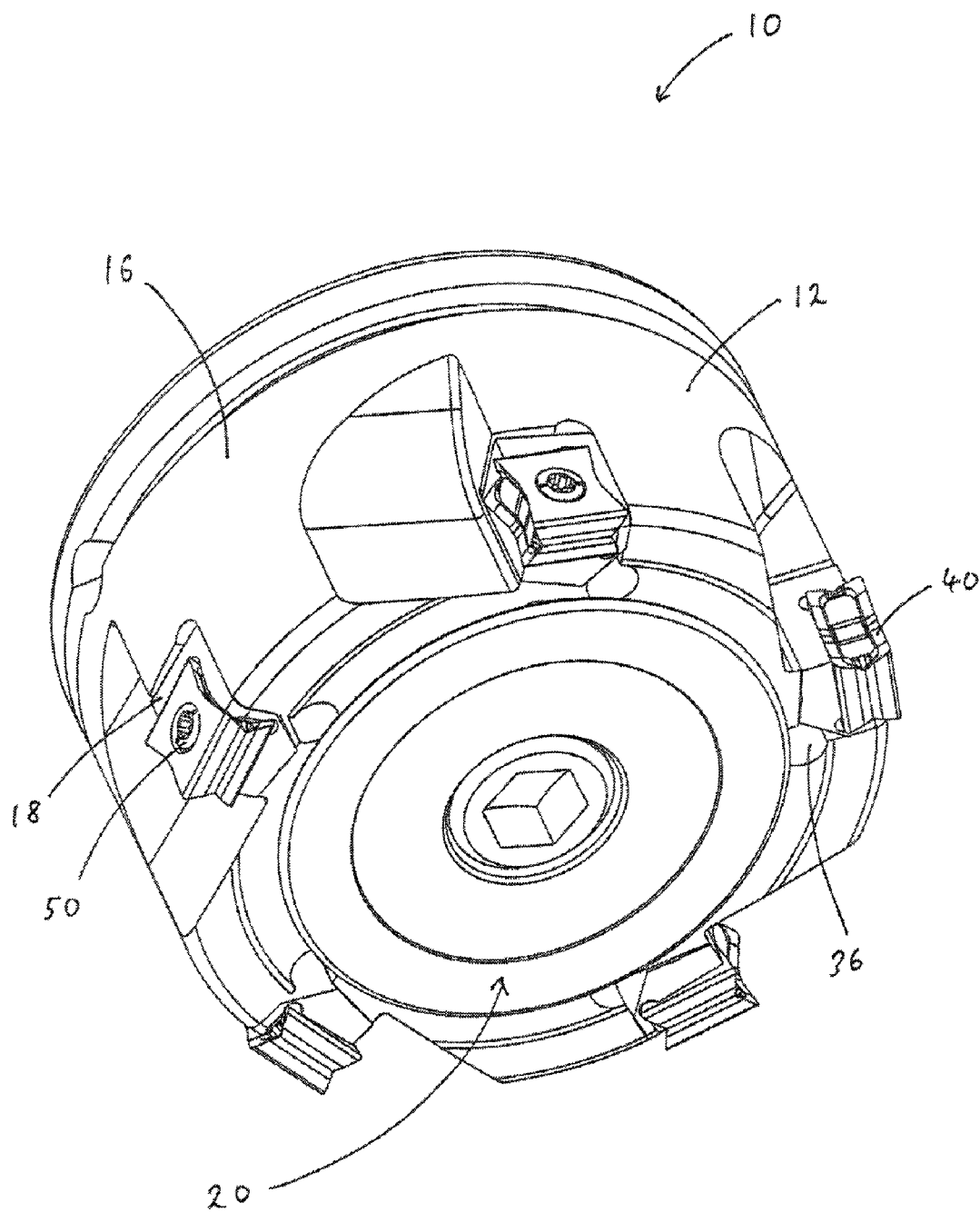
FIG. 1 is a perspective view of a cutting tool according embodiments of the present invention.

It will be appreciated that for simplicity and clarity of illustration, elements shown in the figures have not necessarily been drawn exactly or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 2:
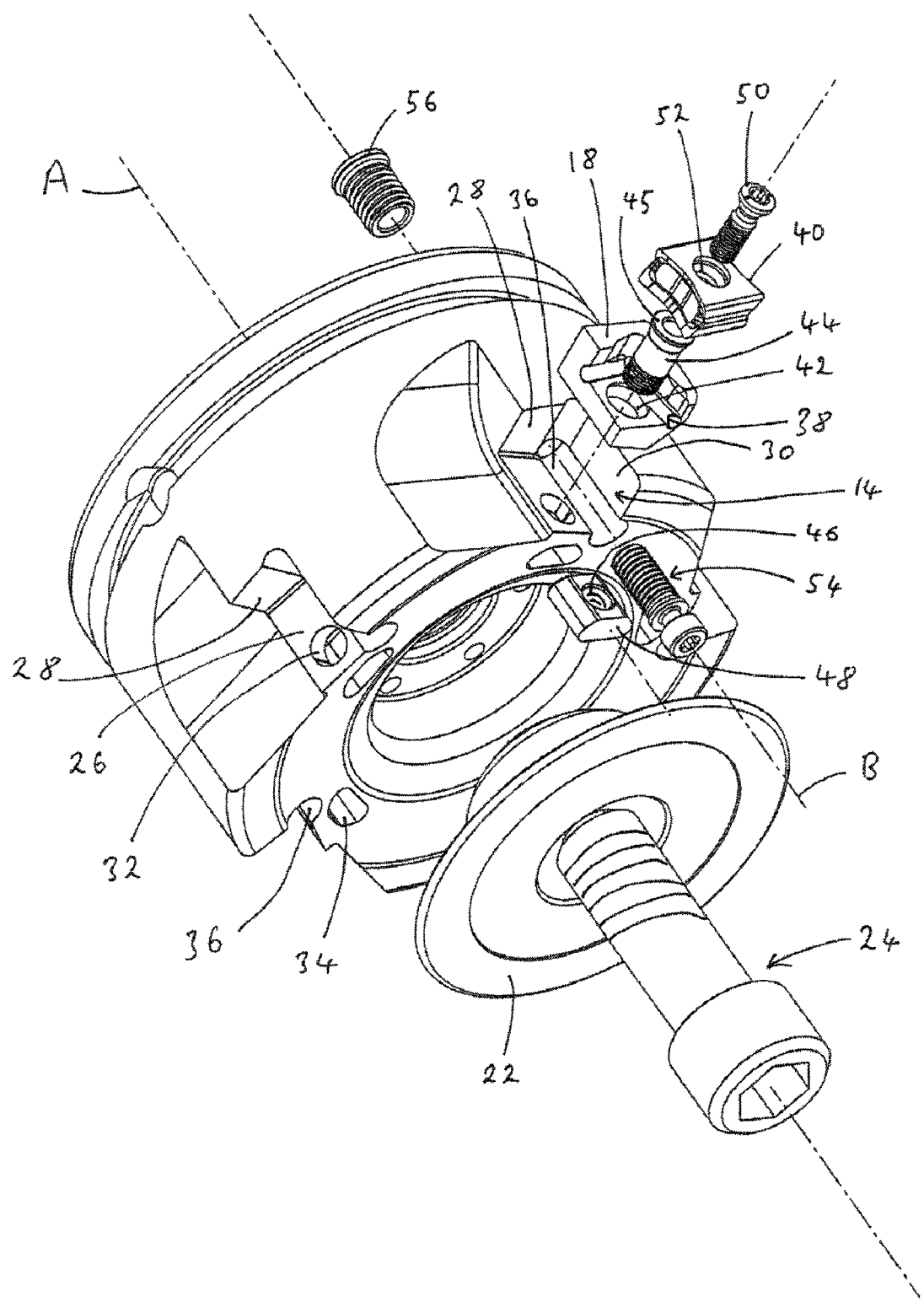
FIG. 2 is an exploded view of the cutting tool of FIG. 1, showing only one cartridge and associated adjustment mechanism.

Reference is made to FIGS. 1 and 2, showing a cutting tool 10 with an axis of rotation A and having adjustment mechanisms in accordance with embodiments of the invention. The cutting tool 10, for example a milling cutter, has a cutter body 12 with circumferentially spaced cartridge pockets 14 formed in an outer peripheral surface 16 of the cutter body 12 for releasably retaining cartridges 18. The cartridge pockets 14 open out to a front face 20 of the cutting tool 10 which is fitted with a cover 22 secured to the cutter body 12 by a bolt 24.

Reference will be made to a specific cartridge pocket 14 and the members associated with that cartridge pocket 14. The cartridge pocket 14 includes a base surface 26, a first side surface 28 and a second side surface 30. In some embodiments, the base surface 26 may be radially outward facing and the first side surface 28 may be axially facing. The first and second side surfaces 28, 30 are oriented transversely to each other and to the base surface 26. The base surface 26 is provided with a cartridge pocket through bore 32 which communicates with a securing nut pocket 34. In some embodiments, the cartridge pocket through bore 32 may be radially directed. The securing nut pocket 34 opens out to the front face 20. A groove 36 is bordered by the base surface 26 and the second side surface 30 and opens out to the cartridge pocket 14. In some embodiments, the groove 36 may be axially directed and the second side surface 30 may also open out to the front face 20 of the cutting tool 10.

The cartridge 18 has a cutting insert pocket 38 for releasably retaining a cutting insert 40. The cartridge 18 has a cartridge through bore 42 having a countersink 43 opening into the base surface 26. The cartridge through bore 42 generally overlaps with the cartridge pocket through bore 32 when the cartridge 18 is retained in the cartridge pocket 14. The cartridge through bore 42 and the cartridge pocket through bore 32 do not necessarily have the same shape, therefore the overlap may only be partial.

As will be described in greater detail below, the cartridge 18 is secured to the cartridge pocket 14 by a cartridge bushing 44 having a head 45. The cartridge bushing 44 is threadingly received in a nut threaded bore 46 of a securing nut 48 when the securing nut 48 is located in the securing nut pocket 34. The cutting insert 40 is retained in the cutting insert pocket 38 and secured thereto by a securing screw 50 which is located in a cutting insert through bore 52 and threadingly received in the cartridge bushing 44. Adjustment of the location of the cartridge 18, and consequently of the cutting insert 40, is performed with an adjustment screw 54 which on the one hand engages the cartridge 18 and on the other hand threadingly communicates with the cutter body 12, either directly by threadingly engaging the cutter body 12 or by threadingly engaging a cutter body bushing 56 located in the cutter body 12. The adjustment screw 54 has an axis of screw rotation B which, in accordance with some embodiments, may be parallel to the axis of rotation A of the cutting tool 10.

Figure 3:
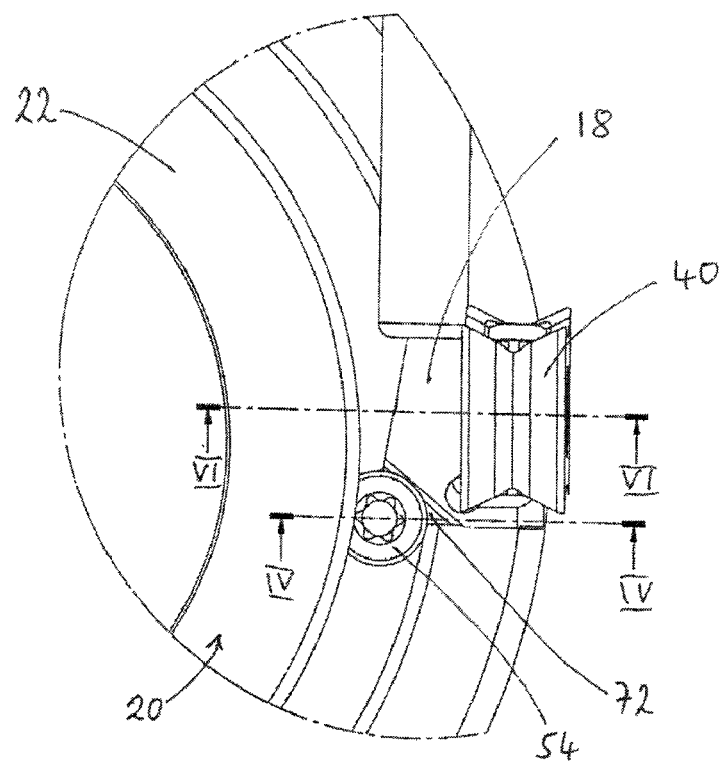
FIG. 3 is a partial bottom view of the cutting tool of FIG. 1.
Figure 4:
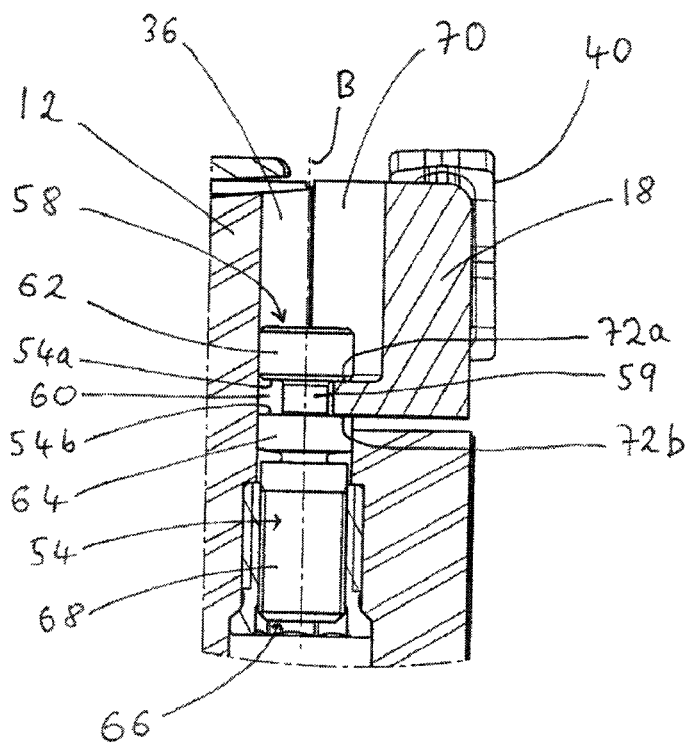
FIG. 4 is a cross-sectional view of the cutting insert taken along line IV-IV in FIG. 3.
Figure 5:
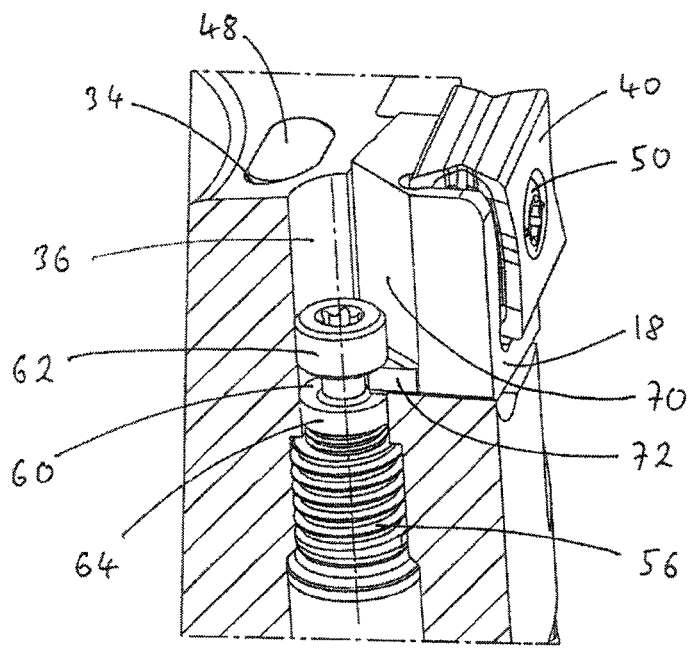
FIG. 5 is a partial cut-away view of the present invention, illustrating the adjustment mechanism.

Reference is now additionally made to FIGS. 3 to 5. The adjustment screw 54 has, adjacent a rear end 58 thereof, a narrow neck portion 59 defining an annular recess 60 located between an adjustment screw head 62 and a flange 64. The adjustment screw head 62 is located in the groove 36. The adjustment screw 54 has, at a forward end 66 thereof, a threaded portion 68. Furthermore, the adjustment screw 54 has a first driving surface 54a and a second driving surface 54b which, in the embodiment shown, are separated by the annular recess 60 formed along the neck portion 59 of the adjustment screw 54.

From a rear surface 70 of the cartridge 18 a protuberance 72 may protrude. However, the protuberance 72 may protrude from other parts of the cartridge 18. The protuberance 72, which has unitary one-piece construction with the cartridge, is received in the annular recess 60 whereby the adjustment screw 54 engages the cartridge 18. A first driven surface 72a and a second driven surface 72b are formed on oppositely facing portions of the protuberance 72.

The flange 64 is flexible and the protuberance 72 and annular recess 60 are dimensioned to enable the protuberance 72 to be snugly fitted in the annular recess 60, for example by an interference fit, thereby coupling the adjustment screw 54 to the cartridge 18, with the first driving surface 54a in abutment with the first driven surface 72a and the second driving surface 54b in abutment with the second driven surface 72b. The flange 64 is chosen to have a degree of flexibility that, on one hand, it will allow the protuberance 72 to be received in the annular recess 60, and on the other hand will cause the protuberance 72 to be held tightly between the adjustment screw head 62 and the flange 64. Hence, there is no play or backlash between the protuberance 72 and the annular recess 60. Consequently, there is no play or backlash between the adjustment screw 54 and the cartridge 18.

Adjustment of the location of the cartridge 18 and consequently of the location of the cutting insert 40 is achieved by screw rotation of the adjustment screw 54 about the axis of screw rotation B. As the adjustment screw 54 is screw rotated it moves along the axis of screw rotation B and takes the cartridge 18 with it due to the fact that the protuberance 72 is firmly located in the annular recess 60 of the adjustment screw 54. If the axis of screw rotation B is parallel to the axis of rotation A of the cutting tool 10 then the adjustment screw 54 moves in the axial direction of the cutting tool 10 as it is screw rotated resulting in axial adjustment of the location of the cartridge 18.

Clearly, the adjustment mechanism is bidirectional. Screw rotation of the adjustment screw 54 in one direction about the axis of screw rotation (B) causes the first driving surface 54a to push the first driven surface 72a such that the cartridge 18 moves in a first direction along the axis of screw rotation (B), and screw rotation of the adjustment screw 54 in another direction about the axis of screw rotation (B) causes the second driving surface 54b to push the second driven surface 72b such that the cartridge 18 moves in a second direction along the axis of screw rotation (B), the second direction being opposite the first direction. Thus, the adjustment screw 54 can either be screw rotated inwardly, progressing into the cutter body 12 and away from the front face 20 of the cutting tool 10 or the adjustment screw 54 can be screw rotated outwardly, progressing towards the front face 20 of the cutting tool 10. In both cases the cutting insert 40 will move with the cartridge 18 in the same direction that the cartridge 18 moves. In other words, screw rotation of the adjustment screw 54 in opposite senses about the axis of screw rotation B results in the adjustment of the position of the cartridge 18 in opposite directions (i.e., bidirectional) in the direction of the axis of screw rotation B. For the sake of clarity it is pointed out that "in the direction of the axis of screw rotation B" should be understood as meaning not only along the axis of screw rotation B but also along any line parallel to the axis of screw rotation B.

In accordance with some embodiments, as shown in FIGS. 4 and 5, the threaded portion 68 of the adjustment screw 54 threadingly engages the cutter body bushing 56 which is located in the cutter body 12. In other words, in accordance with some embodiments, the adjustment screw 54 is partially located in the groove 36 and threadingly engages the cutter body bushing 56. The use of the cutter body bushing 56 is useful for cases in which it is difficult to make an internal thread in the cutter body, for example if the cutter body 12 is made of aluminum. The cutter body bushing 56 is shown to have an external thread, however, when used in aluminum it may be forcibly threaded into a non-threaded bore, or threaded into a bore in which very rough threads have been made just in order to lead the cutter body bushing 56 into position. Clearly, in such a case, the cutter body bushing 56 will also have to be glued into position.

Figure 6:
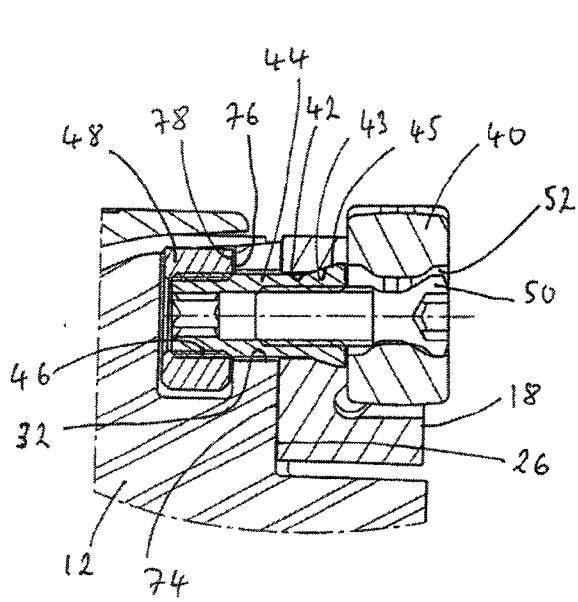
FIG. 6 is a cross-sectional view of the cutting insert taken along line VI-VI in FIG. 3.

Reference is now made to FIG. 6. With the cutting insert 40 securely retained in the cartridge 18 and the cartridge 18 securely retained in the cartridge pocket 14, the base surface 26 of the cartridge pocket 14 abuts a bottom surface 74 of the cartridge 18 and a top surface 76 of the securing nut 48 abuts a top inner surface 78 of the securing nut pocket 34. In accordance with some embodiments, the top inner surface 78 of the securing nut pocket 34 faces radially inward and the top surface 76 of the securing nut 48 faces radially outward.

As can be seen, the cartridge 18 is secured to the cartridge pocket 14 by the cartridge bushing 44 which is located in the cartridge through bore 42 the head 45 of the cartridge bushing 44 located in the countersink 43 of the cartridge through bore 42. The cartridge bushing 44 is threadingly received in the nut threaded bore 46 of the securing nut 48 and the cutting insert 40 is secured to the cutting insert pocket 38 by the securing screw 50 which is located in the cutting insert through bore 52 and threadingly received in the cartridge bushing 44.

During adjustment of the location of the cartridge 18, as the adjustment screw 54 moves and takes the cartridge 18 with it, the securing nut 48 also moves together with the cartridge 18 since the cartridge 18 is secured to the cartridge pocket 14 by the cartridge bushing 44. In view of the fact that the base surface 26 of the cartridge pocket 14 abuts the bottom surface 74 of the cartridge 18 and a top surface 76 of the securing nut 48 abuts the top inner surface 78 of the securing nut pocket 34, the force applied by the adjustment screw 54 has to be sufficient to overcome the frictional forces acting between these abutting surfaces.

Figure 7:
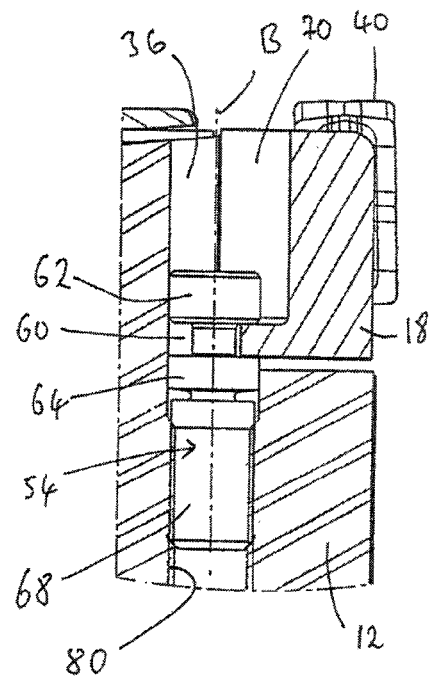
FIG. 7 is a cross-sectional view similar to that shown in FIG. 4 but for another embodiment of the invention.

Reference is now made to FIG. 7 showing an embodiment in which the adjustment screw 54 directly engages the cutter body 12. In this embodiment, the cutter body 12 is provided with a threaded bore 80 and the threaded portion 68 of the adjustment screw 54 threadingly engages the threaded bore 80, instead of the cutter body bushing 56 as seen in the embodiment of FIG. 4. Consequently, in accordance with some embodiments, the adjustment screw 54 is partially located in the groove 36 and threadingly engages the threaded bore 80 in the cutter body. In general, the adjustment screw 54 is partially located in the groove 36 and threadingly communicates with the cutter body 12

The present invention has been illustrated for axial adjustment of the location of cutting inserts. However, there is no inherent limitation on the direction of adjustment. Hence, the adjustment screw 54 could be directed, for example, so that the axis of screw rotation B of the adjustment screw 54 is in the radial direction, thereby giving rise to a bidirectional adjustment mechanism to adjust the radial location of the cutting insert 40. Likewise, the adjustment screw 54 could be directed, for example, so that the axis of screw rotation B of the adjustment screw 54 is in any given intermediate direction between the axial and radial directions, thereby giving rise to a bidirectional adjustment mechanism to adjust the location of the cutting insert 40 in the given intermediate direction. In general, the present invention relates to a cutting tool having an adjustment mechanism for the adjustment of the location of cutting inserts in which the adjustment screw 54 is directed in the direction of adjustment. Hence, for example, for axial adjustment, the adjustment screw 54 is directed in the axial direction, whereas for radial adjustment, the adjustment screw 54 is directed in the radial direction. Clearly, the groove 36 would also have to be appropriately directed in the radial direction and the position of the protuberance 72 would have to be appropriately modified. Likewise, obvious modifications in the location and direction of the securing nut 48 and the securing nut pocket 34 would have to be made.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool comprising:
    a cutter body having at least one cartridge pocket in which a cartridge is releasably retained;
    an adjustment screw having an axis of screw rotation (B) and comprising an annular recess and a threaded portion;
    a protuberance protruding from the cartridge, the protuberance being snugly fitted in the annular recess thereby coupling the adjustment screw to the cartridge, the adjustment screw threadingly communicates with the cutter body, whereby screw rotation of the adjustment screw in opposite senses about the axis of screw rotation (B) results in the bidirectional adjustment of the position of the cartridge in the direction of the axis of screw rotation (B), wherein:
    the cartridge is secured to the cartridge pocket by a cartridge bushing;
    the cartridge has a cutting insert pocket; and
    a cutting insert is secured to the cutting insert pocket by a securing screw which is located in a cutting insert through bore and threadingly received in the cartridge bushing.

2. The cutting tool according to claim 1, wherein the cartridge pocket comprises a base surface, a first side surface and a second side surface, the first and second side surfaces are oriented transversely to each other and to the base surface, a groove, bordered by the base surface and the second side surface, opens out to the cartridge pocket, wherein the adjustment screw is at least partially located in the groove.

3. The cutting tool according to claim 2, wherein the base surface is provided with a cartridge pocket through bore which communicates with a securing nut pocket, the cartridge has a cartridge through bore and the cartridge bushing is located in the cartridge through bore and threadingly received in a nut threaded bore of a securing nut located in the securing nut pocket.

4. The cutting tool according to claim 3, wherein the base surface of the cartridge pocket abuts a bottom surface of the cartridge and a top surface of the securing nut abuts a top inner surface of the securing nut pocket.

5. The cutting tool according to claim 4, wherein:
    the cutting tool has an axis of rotation (A):
    the top inner surface of the securing nut pocket faces radially inward; and
    the top surface of the securing nut faces radially outward.

6. The cutting tool according to claim 2, wherein:
    the base surface is radially outwardly facing;
    the first side surface is axially facing; and
    the groove is axially directed.

7. The cutting tool according to claim 2, wherein the groove opens out to a front face of the cutting tool.

8. The cutting tool according to claim 3, wherein:
    the cutting tool has an axis of rotation (A); and
    the cartridge pocket through bore is radially directed.

9. The cutting tool according to claim 3, wherein the securing nut pocket opens out to the front face of the cutting tool.

10. The cutting tool according to claim 1, wherein the adjustment screw threadingly communicates with the cutter body directly by threadingly engaging the cutter body.

11. The cutting tool according to claim 10, wherein:
    the cutter body is provided with a threaded bore; and
    a threaded portion of the adjustment screw threadingly engages the threaded bore.

12. The cutting tool according to claim 1, wherein the adjustment screw threadingly communicates with the cutter body by threadingly engaging a cutter body bushing located in the cutter body.

13. A cutting tool comprising:
    a cutter body having an axis of rotation (A) and at least one cartridge pocket;
    a cartridge releasably retained in the at least one cartridge pocket, the cartridge comprising:
        a cutting insert pocket;
        a first driven surface; and
        a second driven surface; and an adjustment screw having an axis of screw rotation (B) and being in threading communication with the cutter body, the adjustment screw comprising:
 a screw head;
 a threaded portion;
 a first driving surface; and
 a second driving surface; wherein:
screw rotation of the adjustment screw in one direction about the axis of screw rotation (B) causes the first driving surface to push the first driven surface such that the cartridge moves in a first direction along the axis of screw rotation (B); and
screw rotation of the adjustment screw in another direction about the axis of screw rotation (B) causes the second driving surface to push the second driven surface such that the cartridge moves in a second direction along the axis of screw rotation (B), the second direction being opposite the first direction.

14. The cutting tool according to claim 13, wherein:
the first and second driving surfaces are separated by a recess formed along a neck portion of the assembly screw;
the first and second driven surfaces are formed on oppositely facing portions of a protuberance belonging to the cartridge, the protuberance having unitary one-piece construction with the cartridge; and
the protuberance snugly fits in the recess with the first driving surface in abutment with the first driven surface and the second driving surface in abutment with the second driven surface.

15. The cutting tool according to claim 13, wherein:
a cutter body bushing is located in the cutter body; and
the adjustment screw threadingly engages the cutter body bushing to be in threading communication with the cutter body.

16. The cutting tool according to claim 13, wherein:
the cartridge pocket comprises:
 a base surface;
 a first side surface and a second side surface, the first and second side surfaces being oriented transversely to each other and to the base surface; and
 a groove bordered by the base surface and the second side surface; and
the adjustment screw is at least partially located in the groove.

17. The cutting tool according to claim 16, wherein:
the groove opens out to a front face of the cutter body.

18. The cutting tool according to claim 16, wherein:
the base surface is radially outwardly facing;
the first side surface is axially facing; and
the groove is axially directed.

19. The cutting tool according to claim 16, wherein:
the cutter body comprises a securing nut pocket;
a securing nut is located in the securing nut pocket, the securing nut having a nut threaded bore;
the base surface of the cartridge pocket is provided with a cartridge pocket through bore which communicates with the securing nut pocket; and
the cartridge has a cartridge through bore and is secured to the cartridge pocket by a cartridge bushing, the cartridge bushing being located in the cartridge through bore and threadingly received in the nut threaded bore of the securing nut.

20. The cutting tool according to claim 19, wherein:
a bottom surface of the cartridge abuts the base surface of the cartridge pocket; and
a top surface of the securing nut abuts a top inner surface of the securing nut pocket.

21. The cutting tool according to claim 20, wherein:
the top inner surface of the securing nut pocket faces radially inward; and
the top surface of the securing nut faces radially outward.

22. The cutting tool according to claim 19, wherein:
the cartridge pocket through bore is radially directed.

23. The cutting tool according to claim 19, wherein:
the securing nut pocket opens out to a front face of the cutter body.

24. The cutting tool according to claim 19, further comprising:
a cutting insert retained in the cutting insert pocket and secured thereto by a securing screw which is located in a cutting insert through bore and threadingly received in the cartridge bushing.

* * * * *